(12) United States Patent
Becker et al.

(10) Patent No.: US 6,995,573 B2
(45) Date of Patent: Feb. 7, 2006

(54) PROCESS FOR DETERMINING THE POSITION OF AN INFLUENCING ELEMENT WITH AN INDUCTIVE POSITION SENSOR

(75) Inventors: Raimund Becker, Bodnegg (DE); Klaus Unger, Ebersbach-Musbach (DE); Bjöern Ostertag, Ravensburg (DE); Jaromir Palata, Langenargen (DE)

(73) Assignee: i f m electronic GmbH, Essen (DE)

( * ) Notice: Subject to any disclaimer, the term of this patent is extended or adjusted under 35 U.S.C. 154(b) by 11 days.

(21) Appl. No.: 10/840,236

(22) Filed: May 7, 2004

(65) Prior Publication Data

US 2004/0222801 A1 Nov. 11, 2004

(30) Foreign Application Priority Data

May 7, 2003 (DE) ................................. 103 20 565
Nov. 6, 2003 (DE) ................................. 103 52 351

(51) Int. Cl.
*G01R 27/28* (2006.01)

(52) U.S. Cl. .................................. 324/655; 324/207.15
(58) Field of Classification Search ........... 324/207.15, 324/207.22, 207.24, 207.25, 654, 655
See application file for complete search history.

(56) References Cited

U.S. PATENT DOCUMENTS 6,504,361 B1 * 1/2003 Gleixner ................ 324/207.17
6,836,128 B2 * 12/2004 Palata ....................... 324/655
2003/0034785 A1   2/2003 Palata

FOREIGN PATENT DOCUMENTS

| DE | 31 02 439 A1 | 8/1982 |
| DE | 42 13 866 A1 | 10/1992 |
| DE | 43 37 208 A1 | 5/1995 |
| DE | 196 32 211 A1 | 2/1998 |
| DE | 101 30 572 A1 | 1/2003 |

* cited by examiner

*Primary Examiner*—Walter Benson
(74) *Attorney, Agent, or Firm*—Nixon Peabody LLP; David S. Safran

(57) ABSTRACT

A process for determining the position of an influencing element, using an inductive position sensor, several coils, a capacitor, an amplifier element, at least one changeover switch and an evaluation unit, a selected one of the coils and the capacitor forming a tuned circuit and the tuned circuit and the amplifier element forming an oscillator. Each coil is connected in succession to the capacitor and its impedance measured by the evaluation unit as a function of the position of the influencing element relative to the coil and that coil which is able to determine the location of the influencing element is determined. In further operation, only the impedance of the determined coil or of the tuned circuit formed therewith is measured and used to determine the position of the influencing element, and if the impedance of determined coil changes beyond a threshold amount, the impedance of at least one other coil or tuned circuit is measured.

13 Claims, 3 Drawing Sheets

PROCESS FOR DETERMINING THE POSITION OF AN INFLUENCING ELEMENT WITH AN INDUCTIVE POSITION SENSOR

BACKGROUND OF THE INVENTION

1. Field of the Invention

The invention relates to a process for determining the position of an influencing element with an inductive position sensor, with several coils which are arranged linearly or circularly in succession, with at least one capacitor, with an amplifier element, with at least one changeover switch and with an evaluation unit, one coil and capacitor at a time forming a tuned circuit and the tuned circuit and the amplifier element forming an oscillator as disclosed in published German Patent Application DE 101 30 572 A1 and corresponding U.S. Patent Application Publication 20030034785 A1.

2. Description of Related Art

Position sensors for determining the position of an influencing element are known in a host of embodiments and for a host of applications. These position sensors can, on the one hand, be classified according to whether the motion of the influencing element to be monitored is, first of all, linear motion so that a distance is to be detected by the position sensors, or whether the motion of the influencing element to be monitored is circular motion so that the position sensor monitors or ascertains the angle of rotation of the influencing element. Position sensors which detect a distance are often called distance sensors, while position sensors which detect an angle of rotation are often called angular resolvers.

In addition, position sensors can be classified according to their physical operating principle. For example, inductive, capacitive or optoelectronic position sensors are known.

The subject matter of this invention is a process for determining the position of the influencing element with an inductive position sensor, especially with an inductive displacement sensor with which a linear motion of the influencing element, i.e., a distance, can be measured. These known inductive displacement sensors have several coils, of which at least one coil is made as the primary coil and at least another coil is made as the secondary coil. The coils are generally built according to the transformer principle, so that each secondary coil is located laterally adjacent to the primary coil. The inductive coupling between the center primary coil and the two laterally arranged secondary coils is changed by the position of an influencing element which is made, for example, as a magnetically conductive rod and which is located in the area of the cylinder axis of the cylindrical coil system. These inductive displacement sensors are known from published German Patent Applications DE 43 37 208 A1 and DE 196 32 211 A1.

Published German Patent Application DE 31 02 439 A1 discloses an inductive displacement sensor with two magnetic circuits which are largely decoupled from one another, with two air-core coils, one core being able to dip into the first air-core coil, the instantaneous immersion depth of the core being inductively scanned, and a second core being located stationary in the second air-core coil. The position of the movable core can be determined by measuring the inductance ratio of the first air-core coil to the second coil.

Published German Patent Application DE 42 13 866 A1 discloses an inductive rotary sensor in which several coils are located next to one another on a base plate such that the coils can acquire several measurement values at the same time, by which relatively exact extrapolation of the rotor position is possible. The individual coils are permanently connected to an oscillator stage, the outputs of the oscillator stages being supplied in parallel to the evaluation unit. The position of the evaluation unit is detected by means of pattern analysis of several frequency values which are measured at the same time. However, this type of evaluation can only be conditionally used for high-speed applications as a result of the large amount of information.

The disadvantage of the known inductive displacement sensors is that, on the one hand, the structural length of the displacement sensor is clearly longer than the maximum monitored path of the influencing element so that, at a given path length to be monitored, a displacement sensor up to 100% longer is necessary. This is especially undesirable wherever a limited installation space is available. On the other hand, in the known inductive displacement sensors, the attainable measurement accuracy is often not sufficient or it can only be improved by increased circuit complexity.

This problem is solved in the inductive displacement sensor of published German Patent Application DE 101 30 572 A1, and corresponding U.S. Patent Application Publication 20030034785 A1, in that the individual coils or the individual oscillators are selected in succession by a changeover switch, thereby connecting the individual coils in succession to the capacitor, and in that the evaluation unit measures the change of the impedance of the coil selected by the changeover switch or of the tuned circuit selected by the changeover switch as a function of the position of the influencing element relative to the respective coil.

It is also possible to connect the individual coils in succession not only to a capacitor, but to a fixed, defined tuned circuit. If this fixed tuned circuit is connected to the amplifier element, the circuit has a continuously oscillating oscillator to which only one other (measurement) coil at a time is connected. This has the advantage that oscillation build-up of the tuned circuit or of the oscillator is not necessary.

Although it has been stated above that the individual coils are connected in succession to the capacitor, or to the fixed, defined tuned circuit, it is not meant that the individual coils must be selected in succession by the changeover switch according to their three-dimensional arrangement. Basically, it is also possible to select any coils in time succession by the changeover switch.

By using several coils in succession, the coils being arranged in succession in the direction of the position of the influencing element which is to be ascertained, and the evaluation unit measuring in succession the change of the impedance of each coil or each tuned circuit as a function of the position of the influencing element by the changeover switch, an inductive displacement sensor can be implemented with an overall length which is slightly greater than the total length of the distance which is to be monitored.

In the process of published German Patent Application DE 101 30 572 A1 and corresponding U.S. Patent Application Publication 20030034785 A1, the position of the influencing element can be very precisely and reliably detected by means of an inductive position sensor by the process having the following steps:

selecting one coil or oscillator at a time by the changeover switch by connecting the individual coils in succession to the capacitor, and measuring the impedance of the coil selected by the changeover switch and of the tuned circuit selected by the changeover switch by the evaluation unit as a function of the position of the influencing element relative to the coil, the aforementioned steps being repeated until all coils have been selected in succession by the changeover switch, i.e., have been connected in succession to the capacitor and the impedance of all coils has been measured by the evaluation unit.

However, the known process has the disadvantage that, under certain circumstances, it does not have sufficient measurement speed or reaction time at the desired high accuracy.

SUMMARY OF THE INVENTION

Therefore, a primary object of this invention is to devise a process for determining the position of an influencing element with an inductive position sensor which has high measurement speed at high measurement accuracy.

This object is achieved in the process of the invention in that, in further operation, first only the impedance of the coil or of the tuned circuit is measured which has been determined beforehand as that coil (current coil), with which the position of the influencing element can be determined, and only then is the impedance of at least one other coil or one other tuned circuit measured if the measured value of the impedance of the current coil changes.

It can thus be recognized in accordance with the invention that, in operation, after the current position of the influencing element has been determined at the beginning, the impedance of all coils or of all tuned circuits need not be continuously measured. Rather, it is sufficient if, first of all, only the impedance of a coil which has been determined beforehand as that coil with which the position of the influencing element can be determined is measured. This coil is hereinafter always called the "current" coil. As soon as the influencing element changes its position, this is recognized by the impedance of the coil which has been currently selected by the changeover switch or of the selected tuned circuit changing. Only when this is the case, is it necessary to re-determine the altered position of the influenced element.

Thus, in accordance with the invention, a major shortening of the measurement time has been accomplished by the impedance of all coils not being continuously measured in operation. Only when it is necessary is the impedance of another coil or another tuned circuit measured to determine the position of the influencing element. Measurement of the impedance of the coils or of the tuned circuits which do not currently contribute new information about the position of the influencing element is thus foregone by the process of the invention. In this way, the measurement time which is proportional to the number of coils used can be reduced, i.e., for a total of 16 coils, thus the measurement time in operation can be reduced to roughly 1/16 of the original measurement time.

The current coil can be that coil which is nearest the influencing element. However, it can also be the coil which is located adjacent to the coil which is nearest the influencing element. This is associated with the nonlinear characteristic of the impedance of the individual coils as a function of the position of the influencing element and is moreover also dependent on the width of the influencing element relative to the width of the individual coils. If the width of the influencing element is greater than the width of the individual coils, as is preferably the case, the measurement result of the coil which is directly opposite the influencing element is only conditionally suited for determining the position of the influencing element since, with a small movement of the influencing element, the impedance of this coil hardly changes. In the adjacent coil which is not directly opposite the influencing element, conversely, a small movement of the influencing element causes a large change of the impedance of this coil so that, in this case, this coil is the one with which the position of the influencing element can best be determined. This coil is then the current coil.

According to one preferred embodiment of the invention, when the measured value of the impedance of the current coil or of the tuned circuit changes, the impedance of the coil or the tuned circuit which is located adjacent to the current coil in space is measured. Here, it has been recognized that the position of the influencing element does not change suddenly. Therefore, it is sufficient that, in the next step, first, only the impedance of the adjacent coil or of the adjacent tuned circuit, but not necessarily the impedance of all coils, need be remeasured. Only when this is necessary is the impedance of another, in turn adjacent, coil measured.

As has already been mentioned above, the ratio of the impedance of the coil which has been selected by the changeover switch and of the tuned circuit which has been selected by the changeover switch to the position of the influencing element is not linear. The farther the influencing element is away from the respective coil, the less the change of the impedance by the presence of the influencing element. In addition, for each coil, there is an area within which a certain position change of the influencing element causes a maximum impedance change of the coil. Within this area, the position of the influencing element can then be determined by the respective coil with the highest measurement accuracy. With increasing distance from this "optimum" area of each coil, a position change of the influencing element causes a smaller and smaller impedance change of the coil so that the measurement accuracy which can then be achieved with this coil becomes smaller and smaller.

Advantageously therefore, when the influencing element moves, within a measurement as necessary two coils, specifically the current coil and the spatially adjacent coil, are measured. This yields an increase of the measurement accuracy, advantageously the two coils being measured in alternation, and to determine the position of the influencing element, the measured values of the individual coils being weighted. In doing so, the measured value of those coils is weighted more heavily in which the measurement value is within the linear range of the characteristic, i.e., the influencing element is nearer the "optimum" area of the coil.

According to another advantageous embodiment of the process of the invention, in a calibration process, the influencing element is moved over the maximally measurable length of the inductive displacement sensor and the values of the individual coils or of the individual tuned circuits which are obtained during the calibration process are stored as correction or reference values in the evaluation unit or in an additional storage. In this way, first of all, it is possible to use different influencing elements with different dimensions or from different materials. By this calibration process, component tolerances, especially slightly different inductances of the coils, or changes as a result of temperature fluctuations can be compensated.

Moreover, based on the calibration process, the position of the influencing element at the start of operation, i.e., after selecting the individual coils or tuned circuits, and after measuring the impedances, can be determined especially reliably and accurately. In particular, when at the start of the process this calibration procedure is carried out, even as a result of the current measurement of the impedance of the "selected" coil, a conclusion can be drawn about the direction in which the influencing element is moving. This is possible based on the frequency which changes with the path change of the influencing element and the base frequency of the "coil" which is known by the calibration process.

Finally, according to another advantageous configuration of the invention which will be briefly explained here, in addition to the measurement of the current coil and to the alternating measurement of two adjacent coils, a third coil is measured, the third coil not being adjacent to the current coil. In this way, plausibility checking of the measurement result is easily possible since, when the current coil is influenced by the influencing element, the third coil is essentially not influenced. If this is not the case, i.e., the third coil is influenced, an error in the determination of the position of the influencing element must have occurred.

It was stated above that the evaluation unit measures the change of the impedance of each coil and each tuned circuit. Preferably, the evaluation unit measures the change of the frequency of each coil and each tuned circuit as a function of the position of the influencing element. However, in addition, it is also possible for the evaluation unit to measure the change of the inductance of the coil or of the tuned circuit or the change of the amplitude of the tuned circuit as a function of the position of the influencing element.

According to one preferred embodiment of the invention, if the evaluation unit measures the change of the frequency, generally, the frequency change of the tuned circuit is measured as a function of the position of the influencing element. However, it is also at least theoretically possible for the change of the frequency of only the coil to be measured, to the extent that any real coil in addition to the primarily characteristic inductance also has an ohmic resistance and several parasitic capacitances. Thus, a real coil has an inherent resonant frequency which is determined by the inductance and the parasitic capacitances of the coil. However, generally, the change of the frequency of the tuned circuit comprised of a coil and a capacitor is measured by the evaluation unit.

The influencing of the coil or of the tuned circuit as a function of the position of the influencing element is theoretically based on three different physical effects which have effects of varied intensity depending on which type of influencing element is being used.

Within the framework of this invention, influencing the impedance of the tuned circuit is preferably evaluated by the influencing element based on the transformer principle. The physical effect which is called the transformer principle here is based on the fact that the coil of the tuned circuit produces an alternating electromagnetic field which induces a voltage in an adjacent body—the influencing element—first, according to Faraday's law. When using an influencing element of a material with relatively great conductivity, the induced voltage leads to current flow in the influencing element. This current resulting from the "secondary" voltage which is induced in the influencing element results, on the one hand, in an alternating electromagnetic field which is directed opposite the "primary" alternating electromagnetic field, i.e., the alternating electromagnetic field produced by the coil. This opposite "secondary" alternating electromagnetic field causes a reduction of the inductance, and thus, an increase of the frequency of the tuned circuit. Preferably, this frequency increase is measured and evaluated by the evaluation unit as a function of the position of the influencing element.

The second physical effect which occurs when the impedance of the tuned circuit is influenced by the influencing element is the influencing of the magnetic resistance of the magnetic circuit. If there is no influencing element in the vicinity of the coil, the magnetic resistance is determined solely by the air and is thus very large. If there is an influencing element of a preferably ferromagnetic material in the vicinity of the coil, in this way, the electromagnetic resistance of the magnetic circuit is reduced; this can be ascertained in the reduction of the frequency of the tuned circuit.

The third physical effect which occurs when the impedance of the tuned circuit is influenced by the influencing element is the "genuine" damping of the tuned circuit by energy being removed from the alternating electromagnetic field of the tuned circuit as a result of eddy current losses in the influencing element. This physical effect which is called "genuine" damping here is generally evaluated in inductive proximity switches.

Since theoretically all three effects are active, care must be taken that the two effects which are not to be used for evaluation are negligibly small compared to the effect which is to be used for evaluation.

If the transformer effect is used for evaluation, as is preferably intended, this transformer effect should not be counteracted by the fact that ferromagnetic material reduces the resistance of the magnetic circuit and thus the frequency. Preferably, the influencing is evaluated on the basis of the transformer principle because it can be ensured by a suitable choice of the frequency that the measurement results are essentially independent of the material of the influencing element used. The ferromagnetic effect can then remain ignored. The frequency of the uninfluenced tuned circuit which is to be selected for this purpose is preferably above 500 kHz, for example, between 500 kHz and 10 MHz.

According to the preferred embodiment of the invention, if the change of the frequency of the tuned circuit caused by the influencing element is measured, the inductive position sensor should have at least one counter which is connected, on the one hand, to the oscillator, and on the other hand, to the evaluation unit. The counter can also be integrated directly in the evaluation unit, for example, in a microprocessor. In this case, then, the evaluation unit is connected, on the one hand, to the oscillator, and on the other, to the changeover switch.

According to a first configuration, then, the counter counts the number of oscillations until a preset value is reached and the evaluation unit measures the time which passes until the counter has reached this preset value. Here, it is especially advantageous that the time can be very easily measured with the evaluation unit, for example, a microprocessor. If the transformer principle is used so that the presence of the influencing unit in front of the selected coil increases the frequency of the tuned circuit, this is ascertained in the above described manner of evaluation by the counter's reaching the preset value more quickly as compared to the state in which the coil, and thus, the tuned circuit are not influenced by the influencing element. Thus, the evaluation unit measures a time which is shorter as compared to the uninfluenced state.

In one alternative configuration, the counter—or directly the evaluation unit—counts the number of oscillations of the oscillator during a given time interval or this number is evaluated by the evaluation unit.

Preferably, the process in of the invention for determining the position of an influencing element, for example, of a piston, is carried out according to the aforementioned second configuration. In doing so, not only is the number of oscillations of the oscillator counted by the evaluation unit, but the changeover switch is also controlled as a function of the determined result.

In particular, there is now a host of possibilities for embodying and developing the process of the invention for determining the position of an influencing element with an inductive position sensor. These embodiments and developments are described in detail below in the following description of a preferred embodiment in conjunction with the accompanying drawings.

DETAILED DESCRIPTION OF THE INVENTION

Figure 1:
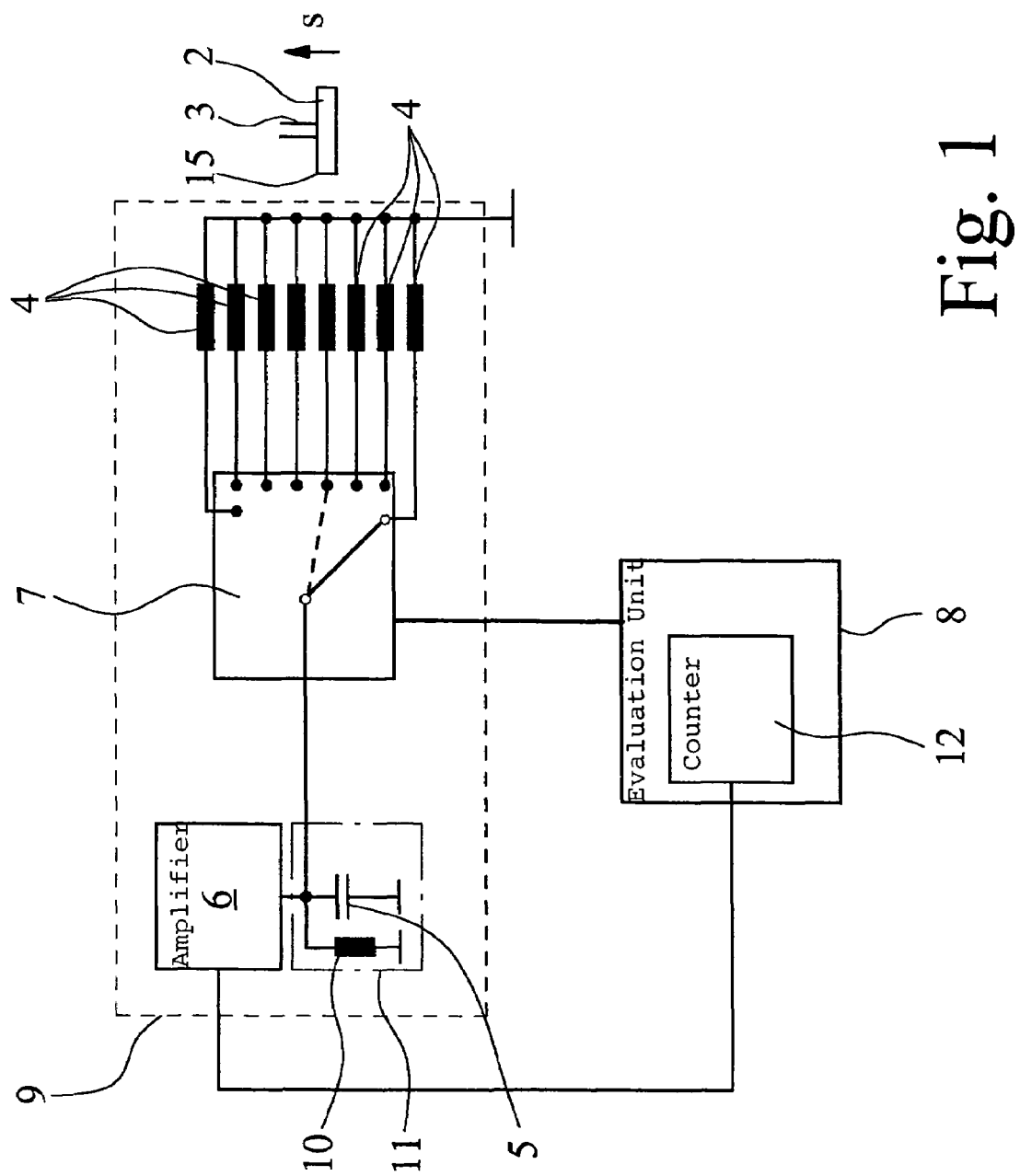
FIG. 1 is a schematic sketch of a circuit structure of an inductive position sensor for use in the process of the invention.

FIG. 1 schematically shows the circuit structure of an inductive displacement sensor for determining the position of an influencing element 2 which is especially well suited for implementing the process. The influencing element 2 can be located, for example, on the end of a rod 3. However, in place of an inductive displacement sensor, the process can also be carried out with an inductive angular resolver.

In the circuit as shown in FIG. 1, only the important components are shown, but not all electrical or electronic or mechanical components of the inductive displacement sensor 1, so that the displacement sensor is shown only incompletely; in particular, the housing which holds the inductive displacement sensor 1 is not shown. Therefore, commonly owned, U.S. Patent Application Publication 20030034785 A1 is hereby incorporated by reference, to which reference can be made for specific embodiments of a suitable inductive displacement sensor.

It can be taken from FIG. 1 that the inductive displacement sensor has several successive coils 4—in the embodiment shown in FIG. 1, a total of eight coils 4—a capacitor 5, an amplifier element 6, at least one changeover switch 7 and an evaluation unit 8. The coils 4 are arranged in succession in the direction of the position s of the influencing element 2, which position is to be determined. Likewise, the coils can however also be arranged in a circle behind one another, then also the influencing element executing circular motion and thus the angle of rotation of the influencing element can be measured.

For a total of eight coils 4, a multiplexer can be used as the changeover switch 7 for connecting one of the eight coils 4 at a time to the capacitor 5. The coil 4 selected by the changeover switch 7 and the capacitor 5 form a tuned circuit. Together with the amplifier element 6, the tuned circuit then forms an oscillator 9 with a resonant frequency which is determined by the inductance of the coil 4 and the capacitance of the capacitor 5. Alternatively, in addition to the capacitor 5, there can also be a fixed coil 10 which together with the capacitor forms a fixed tuned circuit 11. One coil 4 at a time is connected to this tuned circuit 11 (which is shown enclosed by a broken line) so that the fixed tuned circuit 11 and the coil 4 then form a tuned circuit which then forms the oscillator 9 together with the amplifier element 6.

At this point, the change of the frequency of the oscillator 9 and of the tuned circuit for each coil 4 is evaluated in succession as a function of the position of the influencing element 2. In the embodiment as shown in FIG. 1, the evaluation unit 8 measures the change of the frequency of the oscillator 9, but likewise a change of the amplitude of the oscillator 9 can also be evaluated as a function of the position of the influencing element 2.

The preferred evaluation of the frequency change now takes place by the inductive displacement sensor 1 having a counter 12, the counter 12 being a component of the evaluation unit 8. The input of the evaluation unit 8 and of the counter 12 is connected to the oscillator 9 and the output of the evaluation unit is connected to the changeover switch 7. The changeover switch 7 is thus switched by the evaluation unit 8. The counter 12 counts the number N of oscillations of the oscillator 9 within a given time.

According to the process of the invention, the above described measurement sequence takes place only once at the start of the process. If the frequency change of all coils 4 has been measured, i.e., the changeover switch 7 has been switched through by the evaluation unit 8 once from the first to the last position, then the changeover switch 7 is set to the position which corresponds to the coil 4, which has been determined beforehand as that coil 4 (current coil), with which the position of the influencing element 2 can be best determined. In the embodiment shown in FIG. 1, this position of the changeover switch 7 is shown by a broken line.

Figure 2:
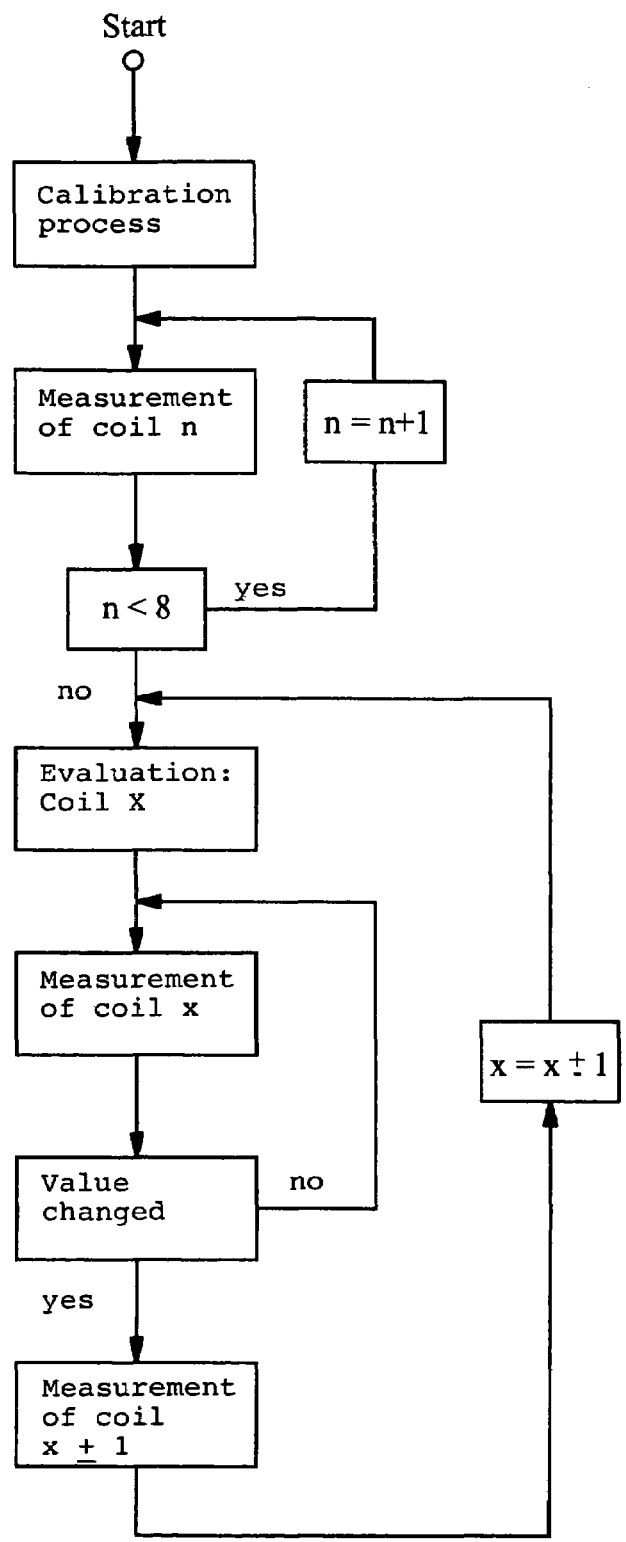
FIG. 2 is a flow diagram of one embodiment of the process in accordance with the invention.

One preferred embodiment of the process in accordance with the invention will be explained using FIG. 2. After starting the measurement process, first a calibration process takes place in which the influencing element is moved over the maximally measurable length of the inductive displacement sensor or over the maximally measurable angle of the angular resolver and the resulting values of the individual coils are stored as correction or reference values. In this way, each individual coil can be assigned an exact reference value which, as a result of production tolerances, can also vary slightly for the individual coils, even for coils which are intentionally identical.

At this point, the actual measurement process begins for determining the current position of the influencing element. In the first process step, to do this first, the first coil or the first oscillator is selected by the changeover switch and the impedance of this coil or of the tuned circuit is measured. Then, accordingly, the impedance of the second coil or of the second tuned circuit is measured. This process is now repeated until, in succession, all coils are selected by the changeover switch and the impedance of the individual coils or tuned circuit has been measured by the evaluation unit. If, overall, there are n=8 coils, the above described measurement process is thus repeated eight times. At the end of this first step, the current position of the influencing element can be determined by the evaluation of the different impedances of the individual coils or tuned circuits.

In a second process step, the changeover switch now selects the coil x which has been determined in the first process step as that coil with which the position of the influencing element can be best determined. In the embodiment as shown in FIG. 1, this would be the fourth coil, i.e., x=4. Then the impedance of the coil x is measured and it is evaluated whether the measured value compared to the value of the impedance of the coil x in the first process step has changed. If this is not the case or if the measured change is below a given boundary value, this means that the influencing element has not changed its position. In this case, next no selection of another coil follows, but the impedance of the coil x is measured again, i.e., the switch is not further advanced. The second measurement pass is thus already ended after the impedance of the coil is measured; it is not necessary to measure the impedances of the other coils.

Conversely, the measurement of the impedance of the coil x results in the value of the impedance having changed as compared to the previous measurement, this means that the position of the influencing element has also been changed. In this case, next follow the selection of the coil x+1 or coil x−1 adjacent to coil x and the measurement of the impedance of this coil. The decision whether the coil x+1 or coil x−1 is selected depends on whether the value has increased or decreased when the coil x is measured. Since this information, value increased or decreased, is present in the evaluation unit, accordingly, the position of the changeover switch can be selected. By measuring the impedance of the coil x and the impedance of the coil x+1 or the coil x−1, the new position of the influencing element can now be determined by the evaluation unit.

In the next step, then in turn, it is checked whether the position of influencing element has changed again by measuring the impedance of the coil x+1 or the coil x−1. However, it is not necessary for this purpose either for the impedance of all coils to be measured. Only the impedance of an individual coil—and optionally the adjacent coil—is in turn measured so that the respective measurement time for determining the position of the influencing element is clearly reduced.

Figure 3:
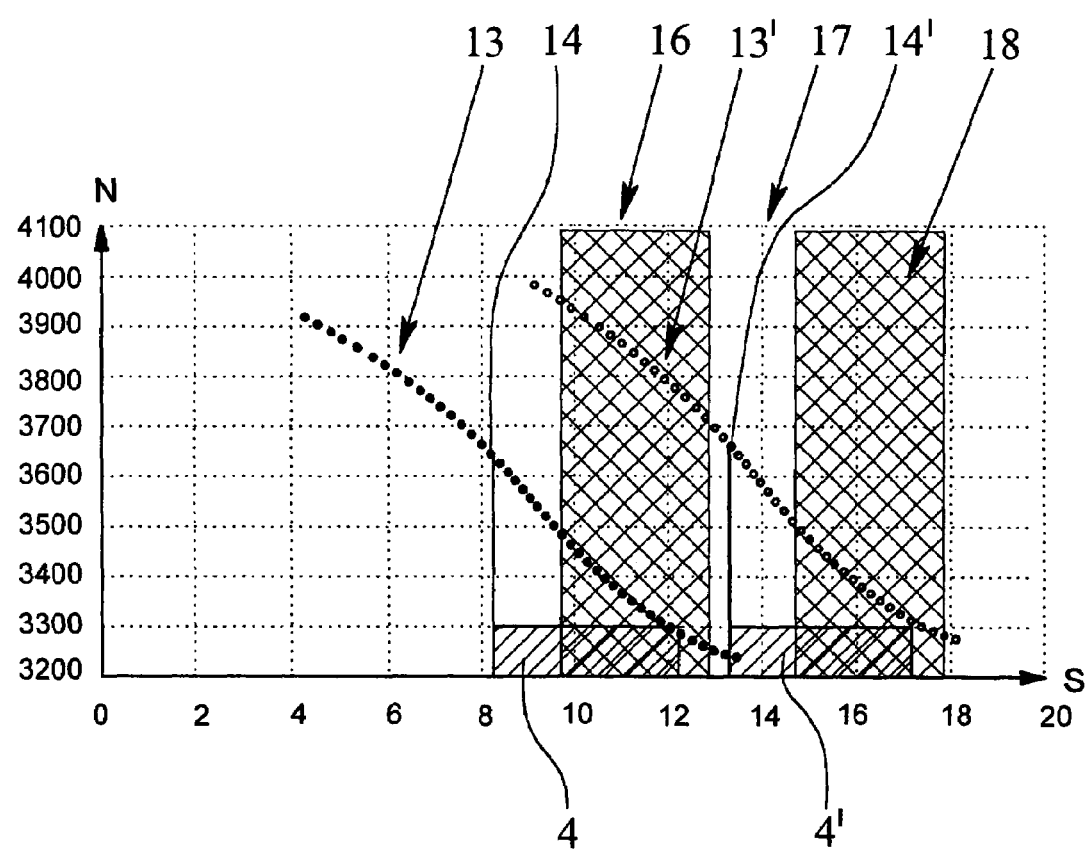
FIG. 3 is a graph of the characteristics of two coils.

FIG. 3 shows a diagram of the characteristics of two coils, in the diagram, the position s of the influencing element 2 being plotted on the x axis and the number N of oscillations of the two coils 4, 4' being plotted on the y axis. It can be taken from the two characteristics 13, 13' of the two coils 4, 4' that there is a respective optimum position 14, 14' of the forward edge 15 of the influencing element 2, at which a small change of the position of the influencing element 2 causes a maximum change of the number N of oscillations of the respective coil 4, 4'. The farther the influencing element 2 is away from this optimum position 14, 14', the smaller the effect of the influencing element 2 on the respective coil 4, 4', so that for a small change of the position s of the influencing element 2, the number N of oscillations of the respective coil 4, 4' within a given time interval does not change or changes only very little. Then, the position s of the influencing element 2 can no longer be determined by this coil 4, 4'.

It will now be explained using FIG. 3 which coil 4, 4' is evaluated depending on the position s of the influencing element 2 according to an advantageous configuration of the process of the invention for determining the position s of the influencing element 2. In doing so, it is assumed that the influencing element 2 as shown in FIG. 3 moves from left to right, its forward edge 15 always being taken as the position s of the influencing element 2. In this embodiment, the two coils 4, 4' each have a width of roughly 4 mm. Then, preferably the influencing element 2 has a length of roughly 8 mm so that the forward edge 15 of the influencing element 2 is first located at position s=8.

FIG. 3 shows that in this position s of the influencing element 2, a small change in the position of the influencing element 2 causes a relatively great change in the number N of oscillations of the coil 4. In this position s of the influencing element 2, thus, the coil 4 is that coil with which the position s of the influencing element 2 can be best determined. The coil 4 in this case is then the "current" coil.

If the influencing element 2 continues to move, gradually the measurement accuracy which can be achieved with the coil 4 is reduced. Therefore, within the cross-hatched area 16, to determine the position s of the influencing element 2, the coil 4' is measured in addition. The farther the forward edge 15 of the influencing element 2 is moved from the optimum position 14 of the coil 4 in the direction of the optimum position 14' of the coil 4', the "better" the measurement result of the coil 4' compared to the measurement result of the coil 4. This is taken into account in the process by the fact that, when determining the position s of the influencing element 2, the measured values of the two measured coils 4, 4' are weighted. The weighting for the respective coil 4, 4' is greater, the nearer the forward edge 15 of the influencing element 2 to the optimum position 14, 14' of the coil 4, 4'. When the influencing element 2 is moved from the position s=10 to the position s=12.5, the weighting of the measurement result for the coil 4 becomes continually smaller, while the weighting of the measurement result for the coil 4' becomes accordingly larger.

Within the area 17 which extends roughly from the position s=12.8 to the position s=14.8, to determine the position of the influencing element 2 only the coil 4' is measured. If the influencing element 2 is moved beyond the position s≈14.8, in turn two coils, specifically the previously current coil 4' and the spatially adjacent coil which is not shown here, are measured in alternation. In turn, the measurement values of the two coils are weighted as a function of the position s of the influencing element 2. The area in which the coil 4' and the next adjacent coil are measured to determine the position of the influencing element 2 is labeled with reference number 18.

What is claimed is:

1. Process for determining the position of an influencing element, with an inductive position sensor having a plurality of coils which are arranged linearly or circularly in succession, a capacitor or a defined tuned circuit, an amplifier element, at least one changeover switch and an evaluation unit, a coil and the capacitor or the defined tuned circuit forming a tuned circuit and the tuned circuit and the amplifier element forming an oscillator, with the following steps:
   connecting the individual coils in time succession to the capacitor or to the defined tuned circuit with the changeover switch,
   measuring the impedance of the coil connected by the changeover switch and of the tuned circuit with the evaluation unit as a function of the position of the influencing element relative to the coil,
the aforementioned steps being repeated until all coils have been connected in succession by the changeover switch to the capacitor or to the defined tuned circuit and the impedance of all coils has been measured once by the evaluation unit, and determining which coil or tuned circuit is able to determine the position of the influencing element;
wherein, in further operation:
   first measuring the impedance of only the coil or of the tuned circuit which has been determined beforehand as that coil or tuned circuit with which the position of the influencing element can be determined and
   only then is the impedance of at least one other coil or one other tuned circuit measured if the measured value of the impedance of the determined coil or tuned circuit has changed beyond a threshold amount.

2. Process as claimed in claim 1, wherein, when the measured value of the impedance of the current coil or tuned circuit has changed beyond said threshold amount, measuring the impedance of the coil or the tuned circuit.

3. Process as claimed in claim 1, wherein, when the measured value of the impedance of the current coil or the tuned circuit has changed beyond said threshold amount, measuring the impedance of the current coil and of the spatially adjacent coil.

4. Process as claimed in claim 3, wherein the determined coil and the spatially adjacent coil are measured in alternation.

5. Process as claimed in claim 3, wherein, in the determination of the position of the influencing element, the measured values of the determined coil and the spatially adjacent coil are weighted.

6. Process as claimed in claim 1, wherein the individual coils are addressable.

7. Process as claimed in claim 1, wherein, in a calibration step, the influencing element is moved over the maximally measurable length of the inductive displacement sensor and the resulting values of the individual coils or tuned circuits are stored as correction or reference values.

8. Process as claimed in claim 1, wherein following the measurement of the determined coil and the spatially adjacent coil, a third coil is measured, the third coil not being adjacent to the determined coil.

9. Process as claimed in claim 1, wherein the evaluation unit measures the change of the frequency of each coil or of each tuned circuit as a function of the position of the influencing element relative to the respective coil or tuned circuit.

10. Process as claimed in claim 9, wherein the inductive position sensor has a counter which is connected to the oscillator and to the evaluation unit, wherein the counter counts in succession the number of oscillations of the oscillator formed with the coil selected by the changeover switch, and wherein the evaluation unit measures the time which passes until the counter has reached a preset value.

11. Process as claimed in claim 9, the inductive position sensor has a counter which is connected to the oscillator and to the evaluation unit, wherein the counter, during a given time, counts the number of oscillations of the oscillator formed with the coil selected by the changeover switch, and the evaluation unit evaluates this number.

12. Process as claimed in claim 9, wherein the evaluation unit, during a given time, counts the number of oscillations of the oscillator formed with the coil selected by the changeover switch, evaluates this number and if the number of oscillations is below a threshold value, triggers the changeover switch to select the next of said coils.

13. Process as claimed in claim 12, wherein the evaluation unit is formed by a microprocessor, and wherein a prescaler is connected upstream of the microprocessor.

* * * * *